United States Patent
Dellanno

(10) Patent No.: US 6,820,930 B2
(45) Date of Patent: Nov. 23, 2004

(54) FLUID-ACTUATED SUPPORT FOR VEHICULAR SEATS

(76) Inventor: Ronald P. Dellanno, 40 Fox Run, North Caldwell, NJ (US) 07006

(*) Notice: Subject to any disclaimer, the term of this patent is extended or adjusted under 35 U.S.C. 154(b) by 0 days.

(21) Appl. No.: 10/422,643

(22) Filed: Apr. 24, 2003

(65) Prior Publication Data

US 2004/0070239 A1 Apr. 15, 2004

Related U.S. Application Data

(60) Provisional application No. 60/376,319, filed on Apr. 29, 2002.

(51) Int. Cl.[7] .................................................. B60N 2/42
(52) U.S. Cl. .................................................. 297/216.12
(58) Field of Search .................... 297/216.12, 216.1, 297/391, 216.13, 216.14

(56) References Cited

U.S. PATENT DOCUMENTS

| | | | | |
|---|---|---|---|---|
| 5,181,763 A | * | 1/1993 | Dellanno et al. | 297/391 |
| 5,290,091 A | * | 3/1994 | Dellanno et al. | 297/391 |
| 5,580,124 A | * | 12/1996 | Dellanno | 297/216.12 |
| 5,769,489 A | * | 6/1998 | Dellanno | 297/216.14 |
| 5,961,182 A | * | 10/1999 | Dellanno | 297/216.12 |

* cited by examiner

Primary Examiner—Milton Nelson, Jr.
(74) Attorney, Agent, or Firm—Klauber & Jackson

(57) ABSTRACT

An apparatus for preventing whiplash related injuries to a passenger in a vehicle. The apparatus includes a frame supported on a seat of the vehicle, and a head and neck restraint secured to the frame and located behind the cranium and cervical spine of a seated passenger. The restraint comprises one or more fluid pressurized bladders, the walls of which are a tough flexible skin. The walls define a supporting device that interfits with the posterior contour of the passenger's cranium and cervical spine. This substantially simultaneously decelerates the cranium and cervical spine during a vehicle collision to prevent whiplash-related injuries to the passenger.

10 Claims, 2 Drawing Sheets

FLUID-ACTUATED SUPPORT FOR VEHICULAR SEATS

RELATED APPLICATIONS

This application claims priority from U.S. provisional application No. 60/376,319 filed Apr. 29, 2002.

FIELD OF THE INVENTION

This invention relates generally to apparatus for supporting a person's cranium, cervical, thoracic, and lumbar spin, including passenger safety apparatus for vehicles, and more specifically, relates to apparatus for preventing whiplash related and similar injuries.

BACKGROUND OF THE INVENTION

Whiplash related injuries are caused by the rapid acceleration of a person's cranium and cervical spin, which occurs, for example, in a rear end automobile collision. The rapid acceleration causes the extension and flexion of the cervical spine which, in turn, can cause severe injury. Types of whiplash related injuries include fractured and/or dislocated vertebrae, torn ligaments (both anterior and posterior of the spinal column), and avulsion of parts of the vertebrae, ligaments and in vertebrae discs. Similar injuries can occur to the thoracic and lumbar spinal areas.

It has thus been found, for example, that the C4, C5 and C6 cervical vertebrae, and the paravertebrae ligaments are most often damaged with whiplash related injuries, although the entire cervical as well as the thoracic and lumbar spine may well be involved. Rapid hypertension of the cervical spin can thus stretch the anterior longitudinal ligament, thus placing it in traction and causing either bone or ligamentous damage. Such hyperextension typically damages the C1 through C7 cervical vertebrae. The vertebral artery, which extends through an opening in the vertebrae, and the sympathetic nerve fibers that surround the artery are also often damaged. These types of injuries cause severe disabilities and, in some instances, death.

Seatbacks and/or headrests in automobiles, trucks, and other types of vehicles are provided to prevent whiplash related injuries to passengers during collisions, but typically fail. During a rear-end vehicle collision, the forces of the collision typically cause a passenger's cranium and cervical spin to rapidly accelerate toward the rear of the vehicle. Once the cranium strikes the seatback or headrest, it then rapidly accelerates in the opposite direction toward the front of the vehicle. The rearward acceleration of the cranium, and resulting collision with the seatback or headrest, causes hyperextension of the cervical spin and, thus typically injures the anterior structure of the passenger's neck. The forward acceleration of the cranium, on the other hand, causes hyperflexion of the cervical spin and typically injures the posterior structure of the neck.

One problem with known seatbacks and/or headrests is that the surface intended to stop the movement of a person's head and neck is typically flat, or does not correspond to the posterior contour thereof. As a result, during a rear-end collision, typically the back, or posterior portion of the cranium is the first portion of the passenger's body to strike the seatback or headrest. However, the cervical spine, which is located inferiorly with respect to the posterior portion of the cranium, continues to move toward the headrest. As a result the cervical spine is forced to move relative to the cranium which, in turn, causes severe vertebral damage.

Also, the top surfaces of many known headrests are located at about the same height, or below the height of a passenger's ears, which is normally about the center of gravity of the head. When a passenger's cranium is forced against such a headrest during a collision, it often slides upwardly over the top edge of the headrest. As a result, the cranium is stretched upwardly relative to the cervical spine typically causing further vertebral damage.

In my issued U.S. Pat. Nos. 5,181,763 and 5,290,091, the entire disclosures of which are hereby incorporated by reference, apparatus is disclosed for preventing whiplash-related injuries to a passenger in a vehicle. In one embodiment of these inventions, the apparatus comprises a frame supported on a seat of the vehicle and located behind the cranium and cervical spin of a passenger on the seat. A layer of resilient material defining a supporting means is located behind the cranium and cervical spine of the passenger and defines one or more contours that interfit with the posterior contour of the passenger's cranium and cervical spine. The supporting means includes a first surface located behind the passenger's cranium and projecting upwardly above the approximate center of mass of the passenger's cranium and having a substantially flat portion including a cranium contact zone for contacting and supporting the approximate central posterior are of the passenger's cranium; and a second surface located below the first surface and defining a substantially convex smooth curve, the maximum protrusion point of which projects anteriorly relative to the flat portion of the first surface. The second surface thereby contacts and supports the posterior portion of the passenger's cervical spine substantially simultaneously with the contact of the passenger's cranium with the first surface, thereby substantially simultaneously decelerating the cranium and cervical spine during a vehicle collision to prevent whiplash-related injuries to the passenger.

In such prior invention, the second surface is smoothly joined to the first surfaces by a transition surface which extends anteriorly at an obtuse angle from the first surface and is located to support the passenger's posterior area approximately where the cranium meets the cervical spine.

A support member is coupled to the frame and supported on the seat, the support member being vertically moveable relative to the seat to adjust the position of the apparatus relative to the passenger and, thus, adjust the position of the supporting means to correspond to the posterior contour of the passenger's cranium and cervical spine.

The frame can define a hollow enclosure and the layer of resilient material may consist essentially of a urethane foam which is molded thereon.

In a further embodiment of my prior apparatus, the first and second surfaces are defined at mutually spaced first and second support bodies, and the apparatus further includes means for vertically and horizontally displacing the first and second surfaces to adjust the position of same to accurately interfit with the posterior contour of different passengers. The first and second support bodies can be coupled to the frame and rendered movable by rack and pinion or equivalent means to enable desired vertical and/or horizontal displacements of same.

In my further U.S. Pat. No. 5,580,124, important modifications and improvements have been made in the aforementioned prior art apparatus to thereby provide yet further improved apparatus for preventing whiplash-related injuries to a passenger in a vehicle. In accordance with such invention, a vehicle-installed supporting seat for the passenger is provided, which includes a seat back provided with an integral head-neck restraint comprising a cranium support portion and a cervical spine support portion. Each said portion includes a layer of resilient material supported on an underlying inflexible support shell, which together act to effectively define a contour that interfits with the posterior contour of the passenger's cranium and cervical spine. This contour thus presents a first surface located behind the passenger's cranium for contacting the approximate center of mass of the cranium and supporting the approximate central posterior area of the passenger's cranium, and a second surface located below the first surface and defining a substantially convex smooth curve, the maximum protrusion point of which projects anteriorly relative to where the first surface contacts the center of mass of the passenger's cranium, the said second surface thereby contacting and supporting the posterior portion of the passenger's cervical spine substantially simultaneously with the said contact of the passenger's cranium with said first surface. The support shell is rearwardly displaceable upon being subjected to impressed forces generated from the passenger pressing against the restraint as a result of a rear end impact at said vehicle. A controllably deformable energy absorbing crush zone is disposed to the rear of the shell as to be compressed by the rearward displacement of the shell. The interfitting contour and thereby the inflexible shell, upon being displaced by said forces toward the underlying crush zone, retain the shape of the contour, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The second surface of said contour is smoothly joined to said first surface by a transition surface of said contour, which extends anteriorly at an obtuse angle from said first surface, and which is located to support the passenger's posterior area approximately where the cranium meets the cervical spine. The maximum protrusion point of said second surface projects anteriorly relative to said flat portion of said first surface a distance of 1 to 6 inches, and the maximum protrusion point is from 3 to 9 inches below the cranium contact zone.

The apparatus of the U.S. Pat. No. 5,580,124 invention preferably further includes a thoracic and lumbar spine support portion which are defined by downward extension of the support shell, resilient material and contour; whereby the thoracic and lumbar spine portion of the passenger are decelerated with the cranium and cervical spine during a rear end impact.

The crush zone may comprise one or more air bladders, and valve means responsive to rear end vehicular impact to enable the one or more bladders to at least partially deflate. The inflexible shell can, for example, be linked to one or more mechanical actuators which open the valves upon a predetermined displacement of the shell; or one or more sensors can upon detecting a rear end impact, actuate the valves to enable controlled deflation of the air bladders.

Similarly, one or more rear impact sensors can enable control signals upon an impact of sufficient magnitude, which signal disables a restraint means, e.g. by releasing a mechanical stop which otherwise prevents displacement of the inflexible shell (or of a plate linked to the shell) against or into the crush zone.

The crush zone can also comprise an impact collapsible cellular structure, such as a frangible foam. In still a further aspect, the crush zone may comprise an elastically deformable material which absorbs energy at a substantially more rapid rate than it releases same.

The crush zone may be sandwiched between the inflexible shell and a spaced fixed, rigid plate; or the crush zone can be spaced from the rear of the shell and contacted and compressed by an intermediate plate which is linked for displacement with the shell. Rearward displacement of the shell may be resisted by restraining means adapted to collapse at a preset strain.

SUMMARY OF THE INVENTION

Now in accordance with the present invention it has been found that by use of one or more inflatable air bladders having high strength exterior walls or skins, the desired specific configurations required for head and neck supports in accordance with the applicant's prior patents may be constructed using the air bladder or bladders proper as the direct support for the resilient external portions of the supports which engage with the passenger's head and neck. More specifically, the said bladders are provided with preformed surfaces such that when inflated the desired support shape is achieved at the portion of the bladder which faces the passenger. The bladder when properly inflated provides a sufficiently rigid curved surface that a further rigid backing plate conforming to the desired passenger—interfitting curve is not required. Since the bladder further is constructed of a expandable material such as a tough natural or synthetic rubber or polymer, at least some variation in the total expansion of the bladder is possible as well as some variation in the firmness in same, i.e., by varying the air pressure applied within the bladder interior. The bladder in turn supports the flexible covering of a natural or synthetic foam or the like which is relatively soft to provide comfort for the passenger. The fact that the bladder interior dimensions may be somewhat enlarged or diminished while yet retaining the basic external shape of its passenger adjacent face enables the passenger support in turn to achieve a degree of variation in its total perimeter dimensions to enable accommodation of passengers of differing sizes and having some variation in the location of curved head, neck and other surfaces to be supported.

BRIEF DESCRIPTION OF DRAWINGS

The invention is illustrated by way of example in the drawings appended hereto in which.

DESCRIPTION OF PREFERRED EMBODIMENTS

Figure 1:
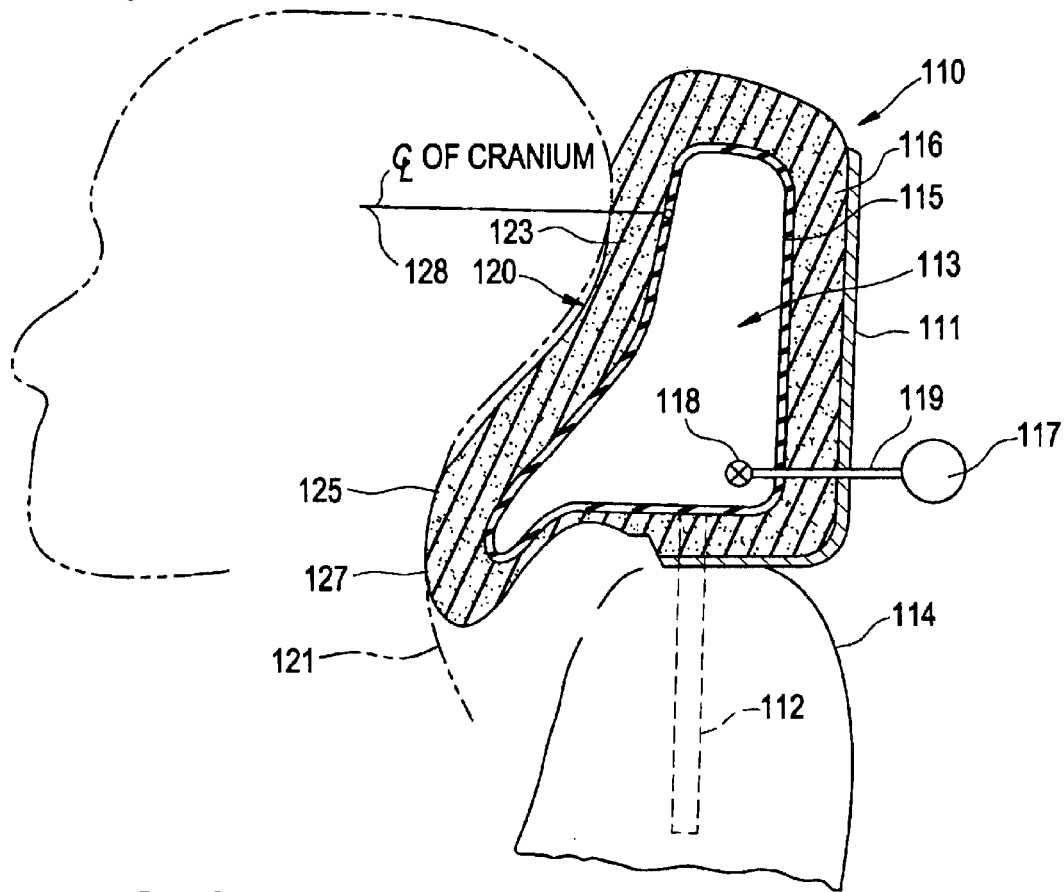
FIG. 1 is a schematic longitudinal cross-section through a support in accordance with the invention, such support being shown mounted on a conventional vehicle seat.

In FIG. 1 a conventional auto seat back 114 is shown at the top of which is mounted a head and neck restraint 110 in accordance with the present invention. A metal frame 111 is secured to the back and bottom of seat back 114. As is known in the art the restraint 110 is mounted by an extension 112 attached to frame 111 and inserted into a suitable receptacle at the top of the auto seat 114. The restraint 110 may be somewhat adjustable in an upward and downward direction as again known in the art, and also may be swivelable about a horizontal axis to enable some adjustment of that type. Suitable mountings and the like are shown in FIG. 6 of my U.S. Pat. No. 5,290,091.

In accordance with the present invention the interior of the restraint 110 comprises an air bladder 113 which is defined by a tough but expandable and flexible wall 115 typically formed of a relatively heavy gauge natural or synthetic rubber or of flexible and expandable synthetic polymeric materials. The bladder 113 will normally in use be filled with air or other fluid. In the present instance a pump 117 is electrically or mechanically actuated, and provides air through channel 119 to the interior of bladder 113 via a one way valve 118.

It will be seen that the external configuration or perimeter of bladder 113 which faces passenger 121 is shaped precisely in accord with the principles of the Applicant's earlier patents and is preferably overlayed by the aforementioned foam layer 116, although depending upon the material constituting wall 115, such a foam layer may not be required. The forward facing portion of the support 110 thus interfits and interacts with the passenger 121 shown in shadow line. Specifically the tough skin or wall 115 of bladder 113 and where present the support layer 116 overlaying the wall 115, serve to define a supporting means 120 located behind the cranium and cervical spine of the passenger and defining a contour that interfits with the posterior contour of the passenger's cranium and cervical spine. The resulting configuration provides a first surface located behind the passenger's cranium and projecting upwardly above the approximate center of mass 128 of the passenger's cranium and including a substantially flat portion including a cranium contact zone 123 for contacting and supporting the approximate central posterior area of the passenger's cranium. A second surface located below the first surface defines in vertical cross section a substantially convex smooth curve 125 the maximum horizontal protrusion point of which projects anteriorly relative to the flat portion of said first surface a distance of 1 to 6 inches. This maximum protrusion point 127 is typically about 3 to 9 inches below the cranium contact zone. The second surface thereby contacts and supports the posterior portion of the passenger's cervical spine substantially simultaneously with the contact of the passenger's cranium with said first surface thereby substantially decelerating the cranium and cervical spine during a vehicle collision to prevent whiplash related injuries to the passenger.

Although the air bladder 113 is shown as a single unit it can be formed as two or more air bladders, which taken together and inflated provide the total external perimeter as shown in FIG. 1. Also, of course, although air pressure is the preferred medium for filling the interior of the bladder 113, other fluids can be used including suitable liquids and/or pumpable slurries.

Figure 2:
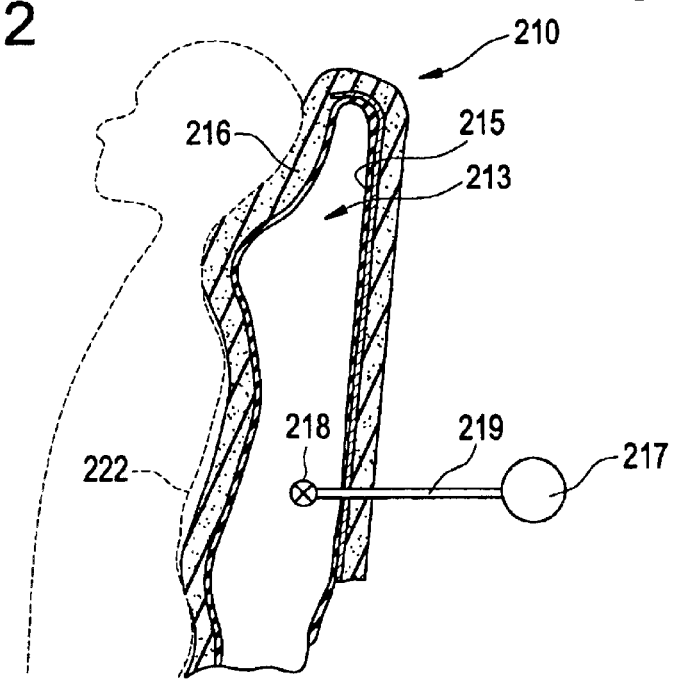
FIG. 2 is a further schematic longitudinal cross-section through an embodiment of the invention which is used to provide support for both the head and neck region of the passenger as well as for the lower back portions of the passenger.

In FIG. 2 a further support 210 is shown. In this instance the vehicle installed supporting seat for a passenger 222 is provided which includes a seatback provided with an integral head neck restraint comprising a cranium support portion as in FIG. 1 and a cervical spine support portion beneath the former. Each portion includes as in FIG. 1 a layer of resilient material 216 which again is supported on one or more underlying flexible air bladders 213 the wall or skin 215 of which comprises the same tough but expandable materials discussed for bladder 113. A single such bladder is shown in FIG. 2 with inflation means being provided as discussed in connection with the embodiment of FIG. 1, i.e., via a manually or electrically operated pump 217 inlet 219 and one way control valve 218. The passenger 222 is shown again in shadow and it will be evident that the passenger is supported in precisely the manner as discussed in connection with the FIG. 1 embodiment except that further support for the passenger is provided by the inclusion of a thoracic and lumbar spine support portion which is defined by the downward extension of the support 210, i.e., by downward extension of the bladder 213 and the overlying layer 216. This assures that the thoracic and lumbar spine portion of the passenger are decelerated with the cranium and cervical spine during a rear end impact. The parameters of support in terms of the various projections and intershaping of the support 210 with respect to the passenger 222 are substantially identical with that discussed in connection with the configuration of FIG. 1 except for the addition of the downward projecting area for further supporting the thoracic and lumbar regions.

Figure 3:
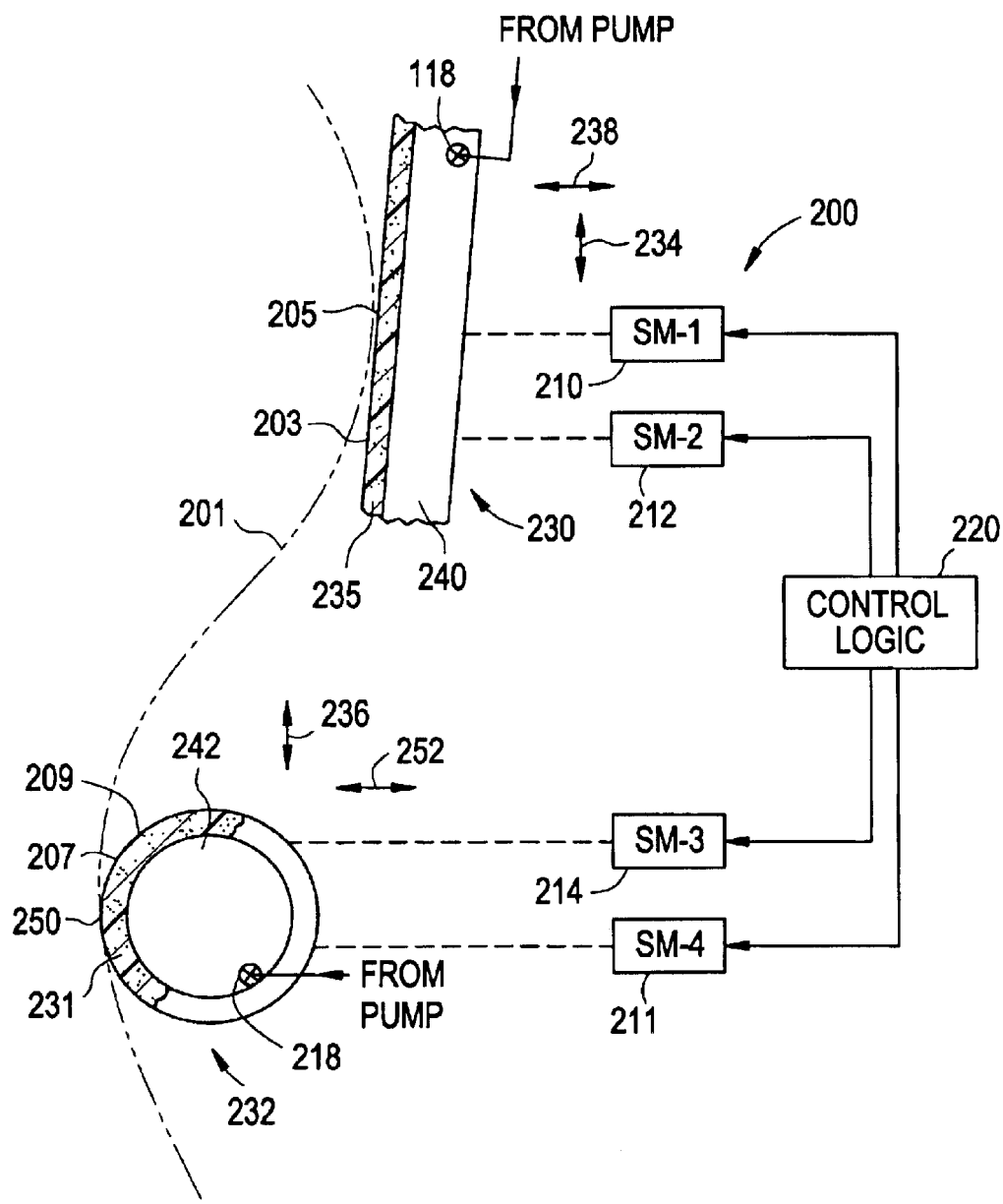
FIG. 3 is a further schematic partial cross-section of a further embodiment of the invention.

In FIG. 3 a schematic view appears, cross-sectional in nature, illustrating a further embodiment of apparatus 200 in accordance with the present invention. The partial outline of a seated passenger as described in prior embodiments, is shown in shadow at 201. In the present instances portions of first and second support surfaces 205 and 209 appear. At least where contact with the passenger is made the walls of bladders 240 and 242 may be covered in the passenger contact zones with a foam, i.e., such as at 235 and 231 which comprises a resilient material as earlier discussed. The functions of the support surfaces 205, 209 are precisely as previously described; specifically the surface 205 is provided with a flat portion, including a cranium contact zone which contacts and supports the approximate central posterior area of the passenger's cranium. The upper part of surface 205 extends above the approximate center of mass of the cranium. The second surface 209, again includes a convex, smooth curve 207 which extends anteriorly toward the passenger, where it contact and cervical spine. The maximum protrusion point 250 of this curve will normally project anteriorly relative to the flat portion of the first surface a distance of 1 to 6 inches, and the maximum protrusion point 250 will, in general, be about 3 to 9 inches below the cranium contact zone, as measured in a vertical direction.

The first and second surfaces, 205 and 209, in apparatus 200, are present on separate mutually spaced first and second support bodies 230 and 232 which comprise one or more air bladders 240, 242. Air pressure to pressurize the bladders can be adjusted via pumps and one-way valves 118 and 218. Surface 235 may be part of a distinct unit or body 230, spaced from the body 232 on which surface 205 is present. The remainder of each support body can take any convenient shape. For example, the support body 230 for first surface 205 can be of generally trapezoidal or slab shape; and the surface 205 can be a portion of a sausage-shaped body which is of circular geometry in transverse cross-section. Surface 209 can also (in cross-section) have other conic section forms—such as a parabolic curve, or an elliptical curve, etc. In practice, each of the bodies 230, 232 are separately moveable in vertical and horizontal directions to enable precise adjustment to interfit with the posterior contour of the passenger. This can be effected by suitable means, as for example shown schematically in the Figure, where servomotors 210, 212, 214 and 211 controlled by logic 220 are coupled to bodies 230 and 232 to enable each of the latter to move in the up and down vertical directions as suggested by arrows 234 and 236, and in the horizontal direction as suggested by arrows 238 and 252. Simple rack and pinion arrangements can be used for these purposes and preferably four servomoters are used, one pair of the servomoters control vertical and horizontal movement of body 230; and the other pair of the servomotors effects vertical and horizontal movement of body 232. It will be evident to those skilled in the art that memory settings can be provided at logic 220 to enable passengers to preset the positions of support bodies 230 and 232 to enable accurate interfit with each passenger using the vehicle in which apparatus 220 is installed.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. An apparatus for preventing whiplash related injuries to a passenger in a vehicle, comprising:

a frame supported on a seat of the vehicle;

a head and neck restraint secured to said frame and adapted for being located behind the cranium and cervical spine of a passenger on the seat;

said restraint comprising one or more fluid pressurized bladders, the walls of which comprise a tough flexible skin, the wall defining a supporting means adapted for being located behind the cranium and cervical spine of the passenger and defining at least on contour that interfits with the posterior contour of the passenger's cranium and cervical spine, and including a first surface adapted for being located behind a said passenger's cranium and projecting upwardly above the approximate center of mass of the said passenger's cranium and including a substantially flat portion including a cranium contact zone adapted for contacting and supporting the approximate central posterior area of the said passenger's cranium, and a second surface located below the first surface and defining in vertical cross-section a substantially convex smooth curve, the maximum horizontal protrusion point of which projects anteriorly relative to the flat portion of said first surface a distance of 1 to 6 inches, the said maximum protrusion point being about 3 to 9 inches below said cranium contact zone, said second surface thereby being adapted for contacting and supporting the posterior portion of the said passenger's cervical spine substantially simultaneously with the said contact of the said passenger's cranium with said first surface, thereby substantially simultaneously decelerating the cranium and cervical spine during a vehicle collision to prevent whiplash-related injuries to the passenger.

2. Apparatus in accordance with claim 1, wherein said restraint comprises a single said bladder.

3. Apparatus in accordance with claim 1, including a foam layer overlying the said bladder in the zones of contact with the said passenger.

4. Apparatus in accordance with claim 1, wherein said second surface is smoothly joined to said first surface by a transition surface extending anteriorly at an obtuse angle from said first surface and being located and adapted to support the passenger's posterior area approximately where the cranium meets the cervical spine.

5. Apparatus in accordance with claim 1, further including a thoracic and lumbar spine support portion which are defined by downward extension of said bladder; whereby the thoracic and lumbar spine portion of the said passenger are decelerated with the cranium and cervical spine during a rear end impact.

6. Apparatus in accordance with claim 1 wherein said bladder is pressurized by air.

7. Apparatus in accordance with claim 6, further including means for adjusting the air pressure in said bladder.

8. Apparatus in accordance with claim 1 wherein said bladder is pressurized by a liquid.

9. Apparatus in accordance with claim 1, wherein said first and second surfaces are defined at mutually spaced first and second support bodies, each of which comprises said bladder.

10. Apparatus in accordance with claim 9, further including means for vertically and horizontally displacing said first and second support bodies to adjust the position of said first and second surfaces to accurately interfit with the posterior contour of different passengers.

* * * * *